(12) United States Patent
Cho et al.

(10) Patent No.: US 7,057,826 B2
(45) Date of Patent: Jun. 6, 2006

(54) SMALL AND FAST ZOOM SYSTEM

(75) Inventors: Gyoung Il Cho, Seoul (KR); Dong Woo Gim, Gyoungnam (KR); Cheong Soo Seo, Seoul (KR); James Greenup Boyd, Brenham, TX (US); Sang Hyune Baek, Suwon (KR)

(73) Assignees: Angstrom Inc., Suwon (KR); Stereo Display Inc., Fullerton, CA (US)

( * ) Notice: Subject to any disclaimer, the term of this patent is extended or adjusted under 35 U.S.C. 154(b) by 0 days.

(21) Appl. No.: 10/806,299

(22) Filed: Mar. 22, 2004

(65) Prior Publication Data
US 2005/0207022 A1    Sep. 22, 2005

(51) Int. Cl.
*G02B 15/00* (2006.01)
(52) U.S. Cl. ...................... 359/683; 359/676
(58) Field of Classification Search ........ 359/676–692, 359/665–667, 290–292
See application file for complete search history.

(56) References Cited

U.S. PATENT DOCUMENTS

| | | | |
|---|---|---|---|
| 2,002,376 A | | 5/1935 | Manfred |
| 4,407,567 A | * | 10/1983 | Michelet et al. ............ 359/676 |
| 4,834,512 A | | 5/1989 | Austin |
| 5,986,811 A | | 11/1999 | Wohlstadter |
| 6,111,900 A | | 8/2000 | Suzudo |
| 6,658,208 B1 | | 12/2003 | Watanabe et al. |
| 6,833,938 B1 | | 12/2004 | Nishioka |
| 2002/0102102 A1 | | 8/2002 | Watanabe et al. |
| 2005/0057812 A1 | | 3/2005 | Raber |

OTHER PUBLICATIONS

Kaneko et al., 2000, "Quick Response Dynamic Focusing Lens using Multi-Layered Piezoelectric Bimorph Actuator," Proceeding of SPIE vol. 4075:24-31.
Cho, 2003, "Fast-response Variable Focusing Micromirror Array Lens," Proceeding of SPIE vol. 5055: 278-286.

* cited by examiner

*Primary Examiner*—Scott J. Sugarman
*Assistant Examiner*—Darryl J. Collins
(74) *Attorney, Agent, or Firm*—Park Law Firm; John K. Park

(57) ABSTRACT

There is a need for a small and fast optical zoom device that can change magnification. Conventional zoom devices require coupled mechanical motions to adjust the axial separations between individual or groups of elements in order to change the optical magnification. The mechanical motions decrease the speed of zooming, increase space and weight for zoom system, may induce unwanted jitter, and require large power consumption. In addition, the mechanical zoom system is restricted to magnifying the area on-axis. To solve problems of conventional zoom system, the zoom system utilizing one or more variable focal length micromirror array lenses without macroscopic mechanical motion of lenses is invented.

7 Claims, 4 Drawing Sheets

SMALL AND FAST ZOOM SYSTEM

BACKGROUND OF THE INVENTION

The present invention relates to an optical zoom device and operational methods for the device.

Conventional zoom devices require coupled mechanical motions to adjust the axial separations between individual or groups of elements in order to change the optical magnification.

FIG. 1 illustrates conventional mechanical zoom system. At the very basic level, a zoom system includes at least one moving lens for zooming. One lens to change the image size is called the variator 1 and another lens to maintain focus through the zoom range is called the compensator 2. The variator 1 is moved to change the image size of object. However, the image is defocused because the imaging position is also changed. Therefore, the variator 1 must move in unison with the compensator lens 2 to zoom and keep the image 3 in focus. These movements are usually mechanically controlled by a zoom ring on the lens barrel.

The mechanical motions decrease the speed of zooming, increase space and weight for zoom system, may induce unwanted jitter, and require large power consumption. In addition, the mechanical zoom system is restricted to magnifying the area on-axis. Therefore, there has been a need for a small and fast zoom device that can change magnification.

SUMMARY OF THE INVENTION

The present invention contrives to solve the disadvantages of the conventional zoom system.

An objective of the invention is to provide a zoom system that is compact and does not have macroscopic mechanical motions of lenses.

Another object of the invention is to provide a zoom system that consumes minimal power.

Still another object of the invention is to provide a zoom system that can compensate various optical distortions or aberrations.

To achieve the above objectives, a zoom system for forming an image with varying magnification including one or more variable focal length lenses is provided.

The variable focal length lenses include a first variable focal length lens and a second variable focal length lens. The focal lengths of the variable focal length lenses are changed to form the image in-focus at a given magnification.

The variable focal length lenses are made of micromirror array lenses. The micromirror array lens include a plurality of micromirrors.

The translation and/or rotation of each micromirror of the micromirror array lens is controlled to get the desired functions of the zoom system.

The micromirrors of the micromirror array lens are arranged to form one or more concentric circles.

Each micromirror of the micromirror array lens may have a fan shape.

The reflective surface of each micromirror of the micromirror array lens is substantially flat. Alternatively, the reflective surface of each micromirror of the micromirror array lens has a curvature. The curvature of the micromirror may be controlled.

Each micromirror of the micromirror array lens is actuated by electrostatic force and/or electromagnetic force.

The micromirror array lens further includes a plurality of mechanical structure upholding the micromirrors and actuating components actuating the micromirrors. The mechanical structures and the actuating components are located under the micromirrors.

The micromirror array lens is a reflective Fresnel lens, and the micromirrors are arranged in a flat plane.

The zoom system includes a beam splitter positioned between the first variable focal length lens and the second variable focal length lens. Alternatively, the first variable focal length lens and the second variable focal length lens are positioned so that the path of the light reflected by the first variable focal length lens and the second variable focal length lens is not blocked.

Each micromirror is controlled to change the focal length of the micromirror array lens.

The micromirror array lens is an adaptive optical component. The micromirror array lens compensates for phase errors of light introduced by the medium between an object and its image and/or corrects the defects of the zoom system that may cause the image to deviate from the rules of paraxial imagery. Also, an object which does not lie on the optical axis can be imaged by the micromirror array lens without macroscopic mechanical movement of the zoom system.

The zoom system may further include a focus lens group, an elector lens group and a relay lens group. The first variable focal length lens forms a variator lens group, and the second variable focal length lens forms a compensator lens group.

The micromirror array lens is controlled to satisfy the same phase condition for each wavelength of Red, Green, and Blue (RGB), respectively, to get a color image. The zoom system may further include a plurality of bandpass filters for color imaging. Also, the zoom system may further include a photoelectric sensor. The photoelectric sensor includes Red, Green, and Blue (RGB) sensors. A color image is obtained by treatment of electrical signals from the Red, Green, and Blue (RGB) sensors. The treatment of electrical signals from the Red, Green and Blue (RGB) sensors is synchronized and/or matched with the control of the micromirror array lens to satisfy the same phase condition for each wavelength of Red, Green and Blue (RGB), respectively.

The zoom system of the present invention includes one or more variable focal-length micromirror array lenses. The zoom system can change the magnification of an imaging system without macroscopic mechanical motions of lenses. The micromirror array lens includes micromirrors and actuating components, and uses a very simple mechanism to control the focal length. The focal length of the micromirror array lens is changed with the translation and/or rotation of each micromirror.

The micromirror has a tiny mass. Therefore, the lens comprising the micromirror has a very fast response time down to hundreds of microseconds. The lens also has a large focal length variation and a high optical focusing efficiency. In addition, the lens makes possible a large size lens, makes the focusing system very simple, and requires low power consumption. The lens has a low production cost because of the advantage of mass productivity. The lens can also compensate for optical effects introduced by the medium between the object and its image and/or corrects the defects of a lens system that cause the image to deviate from the rules of paraxial imagery.

The invention works as a zoom device and includes one or more micromirror array lenses.

The invention changes the magnification of an imaging system by utilizing one or more micromirror array lenses in the optical design.

The micromirror array lens works as a variable focal length lens and includes many tiny micromirrors to reflect the light and actuating components to control the positions of the micromirrors.

Each micromirror has the same function as a mirror. The array of micromirrors works as a reflective focusing lens by making all light scattered from one point of an object have the same periodical phase and converge at one point on image plane. In order to do this, the micromirrors are electrostatically and/or electromagnetically controlled to have desired positions by actuating components. The focal length of the lens is changed by controlling its translation, by controlling its rotation, or by controlling both translation and rotation.

The micromirror array lens can have a polar array of micromirrors. For the polar array, each micromirror has a fan shape to increase an effective reflective area so that the optical efficiency is increased. The aberration of the micromirror array lens can be reduced by micromirrors with curvatures. The optical efficiency of the micromirror array lens also can be increased by locating a mechanical structure upholding micromirror and the actuating components under micromirror to increase an effective reflective area and controlling the curvature of micromirrors.

The micromirror array lens used in the present invention has advantages: (1) the micromirror array lens has a very fast response time because each micromirror has a tiny mass; (2) the lens has a large focal length variation because large numerical aperture variations can be achieved by increasing the maximum rotational angle of the micromirror; (3) the lens has a high optical focusing efficiency; (4) the lens can have a large size aperture without losing optical performance. Because the micromirror array lens includes discrete micromirrors, the increase of the lens size does not enlarge the aberration caused by shape error of a lens; (5) the cost is inexpensive because of the advantage of mass productivity of microelectronics manufacturing technology; (6) the lens can compensate for phase errors introduced by the medium between the object and the image and/or corrects the defects of the lens system that cause its image to deviate from the rules of paraxial imagery; (7) the lens makes the focusing system much simpler; (8) the lens requires small power consumption when electrostatic actuation is used to control it.

The zoom system of the present invention has advantages: (1) a compact zoom system or device is provided; (2) the device has a very high zooming speed; (3) the device has a large variation of magnification; (4) the device has a high optical efficiency; (5) the device can have a large aperture (6) the cost is inexpensive because the micromirror array lens is inexpensive and the macroscopic mechanical displacement of lenses is not necessary; (7) the device can compensate for phase errors introduced by the medium between the object and its image and/or corrects the defects of a lens system that cause the image to deviate from the rules of paraxial imagery; (8) the device is very simple because there is no macroscopic mechanical displacement of lenses; (9) the device requires small power consumption when the micromirror array lens is actuated by electrostatic force.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
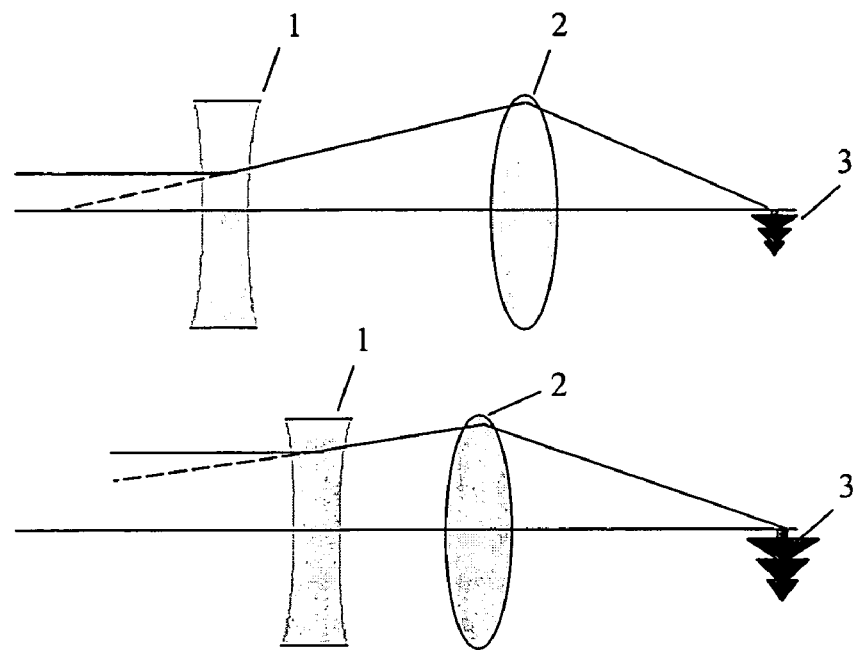
FIG. 1 is a schematic diagram showing a conventional mechanical zoom system.
Figure 2:
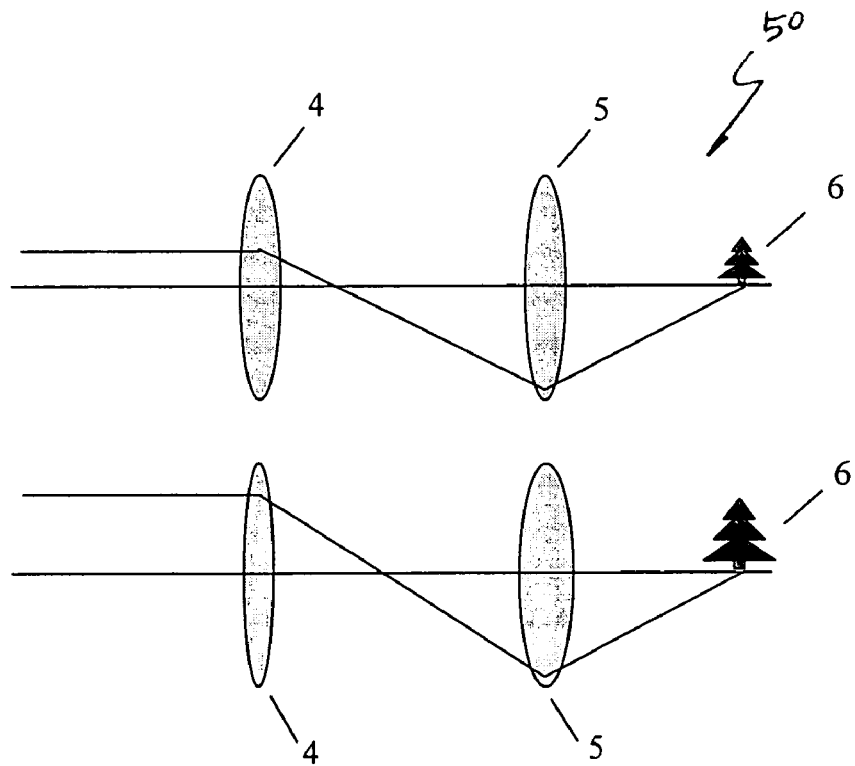
FIG. 2 shows a zoom system using one or more variable focal length lenses.

FIG. 2 shows a zoom system 50 using one or more variable focal length lenses. In the embodiment shown in FIG. 2, the zoom system includes a first variable focal length lens 4 and a second variable focal length lens 5. Changing the magnification of an imaging system is accomplished by utilizing the variable focal length lenses 4, 5. The first variable focal length lens 4 changes the image size. But, the image is defocused because the imaging position is also changed. Therefore, the focal length of the two variable focal length lenses 4, 5 must be changed in unison to magnify and keep the image 6 in-focus.

Figure 3A:
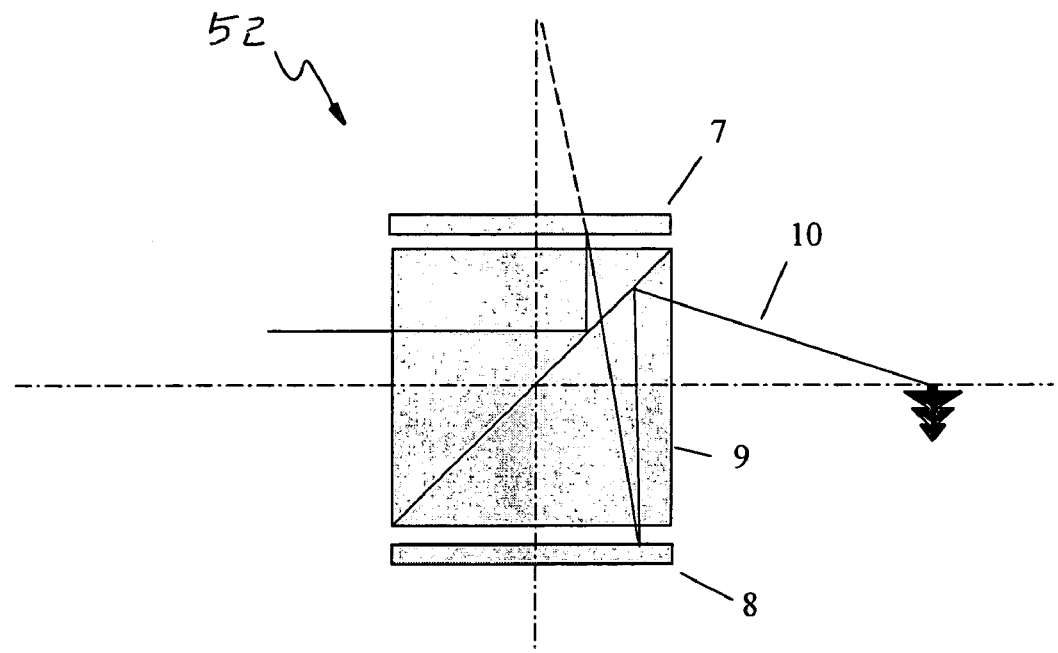
FIGS. 3a and 3b show the zoom systems of present invention using one or more micromirror array lenses.

FIG. 3a shows a zoom system 52, in which one or more micromirror array lenses 7, 8 are used as variable focal length lenses 4, 5.

An example of a micromirror array lens is described in the paper entitled "Fast-response Variable Focusing Micromirror Array Lens" by James G. Boyd IV and Gyoungil Cho, which was published on Mar. 2, 2003. The paper is incorporated by reference into this disclosure as if fully set forth herein.

Because micromirror array lenses 7, 8 are reflective types, it is impossible to make an in-line optical arrangement with micromirror array lenses 7, 8. Therefore, the zoom system 52 includes a beam splitter 9 positioned in the path of light 10. The beam splitter 9 changes the direction of the light 10 by 90°, and thus simulates an in line optical arrangement. As shown in FIG. 3a, the total size of the zoom system 52 is less than a conventional mechanical zoom system because necessary separations between the variator and the compensator and between the compensator and an imaging sensor can be satisfied by a beam splitter 9 and the micromirror array lenses 7, 8 in a small space.

Figure 3B:
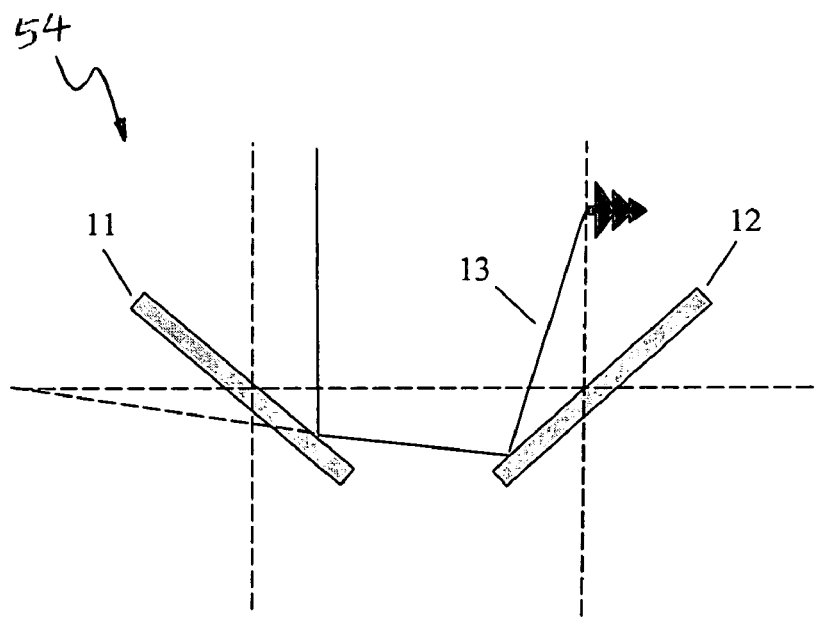

FIG. 3b shows a zoom system 54, in which one or more micromirror array lenses 11, 12 are used as variable focal length lenses 4, 5.

Since it is impossible to make an in-line optical arrangement with micromirror array lenses 11, 12, the micromirror array lenses 11, 12 are positioned so that the path of the light 13 reflected by the micromirror array lenses 11, 12 is not blocked by other components. This arrangement also can reduce the total size of the zoom system 54.

Since the positions of the micromirror array lenses 7, 8, 11, 12 need not be changed, the zoom systems 52, 54 do not need space for lens movement, thus the zoom system 52, 54 can be manufactured with a compact size. Also the power consumption of the zoom systems 52, 54 is minimal since there is no need to move micromirror array lenses 7, 8, 11, 12.

The zoom systems 52, 54 may include five groups of lenses to get necessary performances of a zoom system instead of two variable focal length lenses. They are a focus lens group, variator lens group, compensator lens group, elector lens group and relay lens group. Even though the zoom system using micromirror array lenses is explained with two lenses, actual zoom system using micromirror array lenses also has some groups of lenses.

Figure 4:
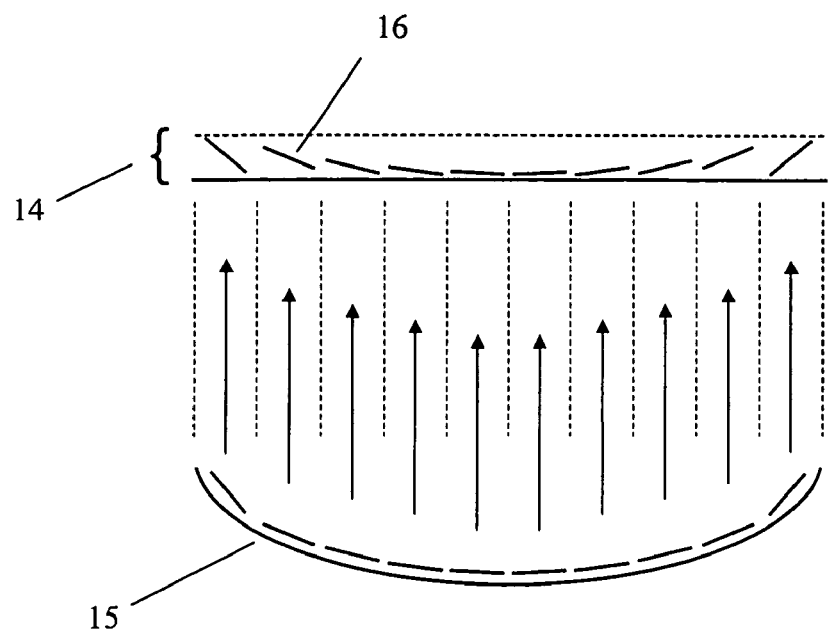
FIG. 4 shows the principle of a micromirror array lens.

FIG. 4 shows the principle of a micromirror array lens 14. There are two conditions for a perfect lens. The first is a converging condition that all light scattered by one point of an object should converge into one point of the image plane. The second is the same phase condition that all the converging light should have same phase at the image plane. To satisfy the perfect lens conditions, the surface shape of conventional reflective lens 15 is generated to have all light scattered from one point of an object to be converged into one point on the image plane and have the optical path length of all the converging light to be same. Even though the optical path length of the converging light is different, the same phase condition can be satisfied because a phase of light is periodic. Therefore, the surface shape of the conventional reflective lens 15 satisfying perfect lens conditions can be replaced by rotation and translation of micromirrors. Each of the micromirror 16 rotates to converge the scattered light and translates to adjust the phase.

Figure 5:
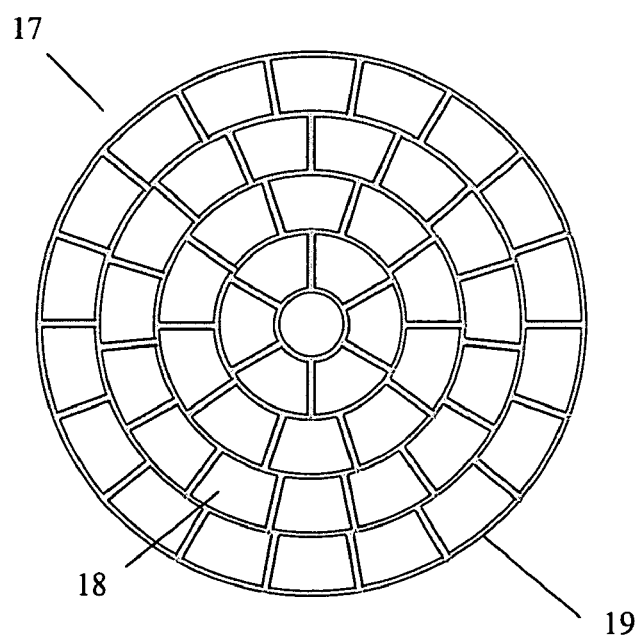
FIG. 5 is a schematic plan view showing the structure of the lens that is made of many micromirrors and actuating components.

FIG. 5 illustrates the two-dimensional view of the micromirror array lens 17. Each micromirror 18 is electrostatically and/or electromagnetically controlled by the actuating components 19. Because a lens is axisymmetric, the micromirror array lens 17 can have a polar array of the micromirror 18. Each of the micromirrors 18 can have a fan shape to increase an effective reflective area, which increases the optical efficiency.

The mechanical structures upholding each micromirror and actuating components to rotate and translate the micromirrors 18 are located under the micromirrors 18 so that the micromirrors 18 are to be closer one another thereby increasing the effective reflective area.

Figure 6:
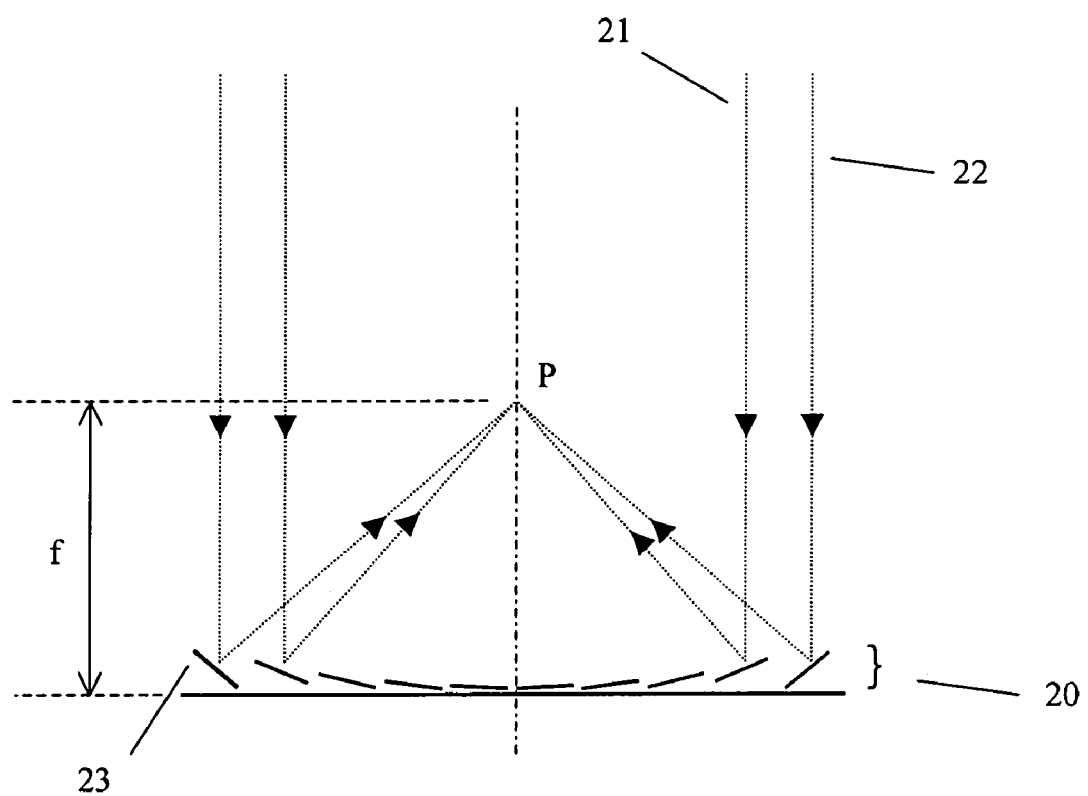
FIG. 6 is a schematic diagram showing how a micromirror array lens works as a lens.

FIG. 6 illustrates how the micromirror array lens 20 gets an image. Arbitrary scattered light 21, 22 are converged into one point P on the image plane by controlling position of each of the micromirror 23. Phases of arbitrary light 21, 22 can be adjusted to be the same by translating each of the micromirror 23. The required translational displacement is at least half of the wavelength of light.

The focal length f of the micromirror array lens 20 is changed by controlling the rotation and/or translation of the micromirror 23. The micromirror array lens 20 is possible by controlling only rotation without controlling translation even though it can not satisfy the phase condition. In this case, the imaging quality of the lens 20 generated by controlling only rotation is degraded by the aberration. Pure translation without rotation can satisfy the two imaging conditions by Fresnel diffraction theory. The lens generated by the control of only translation has the aberration too. The smaller the sizes of the micromirror 23 are, the less is the aberration. Even though the quality of the lens with one motion is lower than the lens with rotation and translation, the lens with one motion has the advantage that its control and fabrication is easier than the lens with rotation and translation.

It is desired that each of the micromirrors 23 has a curvature because the ideal shape of a conventional reflective lens 15 has a curvature. However, since the aberration of the lens with flat micromirror 23 is not much different from the lens with curvature if the size of element is small enough, there is not much need to control the curvature.

The micromirror array lens is an adaptive optical component because the phase of light can be changed by the translations and/or rotations of micromirrors. The micromirror array lens can correct the phase errors as an adaptive optical component can correct the phase errors of light introduced by the medium between the object and its image and/or corrects the defects of a lens system that cause its image to deviate from the rules of paraxial imagery. For an example, the micromirror array lens can correct the phase error caused by optical tilt by adjusting the translations and/or rotations of micromirrors. This allows magnification of any object within the Field of View without macroscopic mechanical motion of some portion of the optical system. Thus, the object to be magnified does not have to lie on the optical axis as in a conventional system.

The same phase condition satisfied by the micromirror array lens uses an assumption of monochromatic light. Therefore, to get a color image, the micromirror array lens of the zoom system is controlled to satisfy the same phase condition for each wavelength of Red, Green, and Blue (RGB), respectively, and the zoom system can use bandpass filters to make monochromatic lights with wavelength of Red, Green, and Blue (RGB).

If a color photoelectric sensor is used as an image sensor in the zoom system using a micromirror array lens, a color image can be obtained by treatments of electrical signals from Red, Green, and Blue (RGB) sensors with or without bandpass filters, which should be synchronized and/or matched with the control of micromirror array lens.

To image the Red light scattered from an object, the micromirror array lens is controlled to satisfy the phase condition for the Red light and Red, Green, and Blue image sensors measure the intensity of each Red, Green, and Blue light scattered from an object. Among them, only the intensity of Red light is stored as image data because only Red light is imaged properly. To image each Green and Blue light, the micromirror array lens and each imaging sensor works in the same manner with the process of the Red light. Therefore, the micromirror array lens is synchronized and/or matched with Red, Green, and Blue imaging sensors.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A zoom system for forming an image with varying magnification comprising one or more variable focal length lenses, wherein the variable focal length lens is made of a micromirror array lens, wherein the micromirror array lens comprises a plurality of micromirrors, wherein each micromirror is controlled to change the focal length of the micromirror array lens, wherein the micromirror array lens further comprises a plurality of mechanical structures upholding the micromirrors and actuating components actuating the micromirrors, wherein the micromirror array lens is an adaptive optical component, wherein the micromirror array lens corrects aberrations.

2. A zoom system for forming an image with varying magnification comprising one or more variable focal length lenses, wherein the variable focal length lens is made of a micromirror array lens, wherein the micromirror array lens comprises a plurality of micromirrors, wherein each micromirror is controlled to change the focal length of the micromirror array lens, wherein the micromirror array lens further comprises a plurality of mechanical structures upholding the micromirrors and actuating components actuating the micromirrors, wherein the micromirror array lens is an adaptive optical component, wherein the micromirror array lens corrects the defects of the zoom system that cause the image to deviate from the rules of paraxial imagery.

3. A zoom system for forming an image with varying magnification comprising one or more variable focal length lenses, wherein the variable focal length lens is made of a micromirror array lens, wherein the micromirror array lens comprises a plurality of micromirrors, wherein each micromirror is controlled to change the focal length of the micromirror array lens, wherein the micromirror array lens further comprises a plurality of mechanical structures upholding the micromirrors and actuating components actuating the micromirrors, wherein the micromirror array lens is controlled to satisfy the same phase condition for each wavelength of Red, Green, and Blue (RGB), respectively, to get a color image.

4. The zoom system of claim 3, further comprising a plurality of bandpass filters.

5. The zoom system of claim 3, further comprising a photoelectric sensor, wherein the photoelectric sensor comprises Red, Green, and Blue (RGB) sensors, wherein a color image is obtained by treatment of electrical signals from the Red, Green, and Blue (RGB) sensors.

6. The zoom system of claim 5, wherein the treatment of electrical signals from the Red, Green and Blue (RGB) sensors is synchronized and/or matched with the control of the micromirror array lens to satisfy the same phase condition for each wavelength of Red, Green and Blue (RGB), respectively.

7. A zoom system for forming an image with varying magnification comprising one or more variable focal length lenses, wherein the variable focal length lens is made of a micromirror array lens, wherein the micromirror array lens comprises a plurality of micromirrors, wherein each micromirror is controlled to change the focal length of the micromirror array lens, wherein the micromirror array lens further comprises a plurality of mechanical structures upholding the micromirrors and actuating components actuating the micromirrors, wherein the variable focal length lenses comprise a first variable focal length lens and a second variable focal length lens, wherein the focal length of the first variable focal length lens and the focal length of the second variable focal length lens are changed to form the image in-focus at a given magnification, further comprising a focus lens group, an elector lens group and a relay lens group, wherein the first variable focal length lens forms a variator lens group, and the second variable focal length lens forms a compensator lens group.

* * * * *